(12) United States Patent
Peterson

(10) Patent No.: US 10,091,201 B2
(45) Date of Patent: *Oct. 2, 2018

(54) MOBILE DEVICE IDENTIFY FACTOR FOR ACCESS CONTROL POLICIES

(71) Applicant: SonicWALL US Holdings Inc., Santa Clara, CA (US)

(72) Inventor: Christopher D. Peterson, Seattle, WA (US)

(73) Assignee: SonicWALL Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,985

(22) Filed: Jan. 29, 2014

(65) Prior Publication Data

US 2014/0150070 A1    May 29, 2014

Related U.S. Application Data

(63) Continuation-in-part of application No. 13/398,616, filed on Feb. 16, 2012, now Pat. No. 8,826,388.

(51) Int. Cl.
*H04L 29/00* (2006.01)
*H04L 29/06* (2006.01)

(52) U.S. Cl.
CPC ........ *H04L 63/101* (2013.01); *H04L 63/0272* (2013.01)

(58) Field of Classification Search
USPC ......................................................... 726/21
See application file for complete search history.

(56) References Cited

U.S. PATENT DOCUMENTS

| | | |
|---|---|---|
| 5,757,924 A | 5/1998 | Friedman et al. |
| 6,611,863 B1 | 8/2003 | Banginwar |
| 7,082,521 B1 | 7/2006 | Nanja |
| 7,356,011 B1 | 4/2008 | Waters et al. |
| 7,356,835 B2 | 4/2008 | Gancarcik et al. |
| 8,392,972 B2 | 3/2013 | Manring |
| 8,695,091 B2 | 4/2014 | Komli |
| 8,826,388 B2 | 9/2014 | Peterson |
| 8,826,424 B2 | 9/2014 | Lyne |
| 8,832,828 B2 | 9/2014 | Lyne |
| 8,914,438 B2 | 12/2014 | Pletter et al. |

(Continued)

OTHER PUBLICATIONS

Howard Gobioff, et al., "Security for Network Attached Storage Devices", Oct. 23, 1997, Publ. by School of Computer Science, Carnegie Mellon University, 22 pages.

(Continued)

*Primary Examiner* — Ghazal Shehni
(74) *Attorney, Agent, or Firm* — Polsinelli LLP

(57) ABSTRACT

A secure VPN connection is provided based on user identify and a hardware identifier. A client application may initiate the VPN connection. A client device user may provide identification information to the application, which then sends a VPN connection request to a remote VPN gateway. The VPN gateway may require an equipment identifier to establish the secure VPN gateway. If the hardware ID is registered, the secure VPN connection is established. If the hardware ID is not registered with the VPN gateway, the connection may be denied. In some instances, a connection may be established with an unregistered equipment ID based on settings at the VPN gateway.

15 Claims, 6 Drawing Sheets

(56) References Cited

U.S. PATENT DOCUMENTS

| | | |
|---|---|---|
| 9,015,789 B2 | 4/2015 | Thomas |
| 9,043,282 B2 | 5/2015 | Tyhurst |
| 2003/0200455 A1 | 10/2003 | Wu |
| 2005/0027657 A1* | 2/2005 | Leontiev et al. ............... 705/59 |
| 2009/0157595 A1* | 6/2009 | Gubitz .............................. 707/1 |
| 2009/0217346 A1 | 8/2009 | Manring |
| 2010/0205215 A1 | 8/2010 | Cook |
| 2010/0333177 A1 | 12/2010 | Donley |
| 2011/0078497 A1 | 3/2011 | Lyne |
| 2011/0119738 A1 | 5/2011 | Piepenbrink et al. |
| 2013/0219469 A1 | 8/2013 | Peterson |
| 2014/0373110 A1 | 12/2014 | Peterson |

OTHER PUBLICATIONS

U.S. Appl. No. 13/398,616,Office Action dated Oct. 21, 2014.
U.S. Appl. No. 13/398,616, Final Office Action dated Dec. 24, 2013.
U.S. Appl. No. 13/398,616,Office Action dated Jul. 16, 2013.
U.S. Appl. No. 14/475,408,Final Office Action dated Apr. 17, 2015.
U.S. Appl. No. 14/475,408,Office Action dated Oct. 21, 2014.
He et al., Qu; "The Quest for Personal Control over Mobile Location Privacy", IEEE Communications Magazine, May 2004.
Huang et al., Dijiang; "Secure Data Processing Framework for Mobile Cloud Computing", IEEE INFOCOM 2011 Workshop on Cloud Computing, 2011.
U.S. Appl. No. 14/475,408,Office Action dated Jun. 9, 2016.
U.S. Appl. No. 14/475,408,Office Action dated Aug. 28, 2017.

\* cited by examiner

MOBILE DEVICE IDENTIFY FACTOR FOR ACCESS CONTROL POLICIES

CROSS-REFERENCE TO RELATED APPLICATIONS

The present application is a continuation-in-part and claims the priority benefit of U.S. patent application Ser. No. 13/398,616, filed Feb. 16, 2012, now U.S. Pat. No. 8,826,388 the disclosure of which is incorporated herein by reference.

BACKGROUND OF THE INVENTION

A virtual private network (VPN) is a private network that uses a public network such as the Internet to connect remote sites or users together. The VPN uses "virtual" connections through the Internet from the business's private network to the remote site or employee. By using a VPN, businesses ensure security—anyone intercepting the encrypted data can't read it.

Virtual private networks typically require a password or other security string provided from a user to establish a secure connection. A user provided password provides a level of security, but is not always sufficient by itself. There is a need in the art for providing a more secure VPN connection.

SUMMARY OF THE CLAIMED INVENTION

A secure VPN connection is provided based on user identify and a hardware identifier. A client application on client device may establish a VPN connection with a VPN gateway using a request that includes user identification and an equipment identifier. The equipment identifier is an unmutable number that is retrieved from a hardware component of the client device. If the user identifier and hardware identifier are registered, the secure VPN connection is established. If the hardware identifier is not registered with the VPN gateway, the connection may be denied. In some instances, a connection may be established with an unregistered equipment ID based on VPN connection settings.

In one claimed method, establishing a connection begins with receiving a client access request from a client. A client hardware identifier may be compared to a list of hardware identifiers. A level of access may be provided based on the hardware identifier.

DETAILED DESCRIPTION

Embodiments of the invention provide a secure virtual private network (VPN) connection based on a user identify and a hardware identifier. A client device includes a client application that may initiate the VPN connection. A client device user may provide identification information to the application. The application then sends a VPN connection request to a remote VPN gateway. The VPN gateway may require an equipment identifier to establish the secure VPN gateway. The hardware ID may be accessed by the client application and provided to the VPN gateway. If the hardware ID is registered=the secure VPN connection is established. If the hardware ID is not registered with the VPN gateway, the connection may be denied. In some embodiments, a connection may be established with an unregistered equipment ID based on settings at the VPN gateway.

Figure 1:
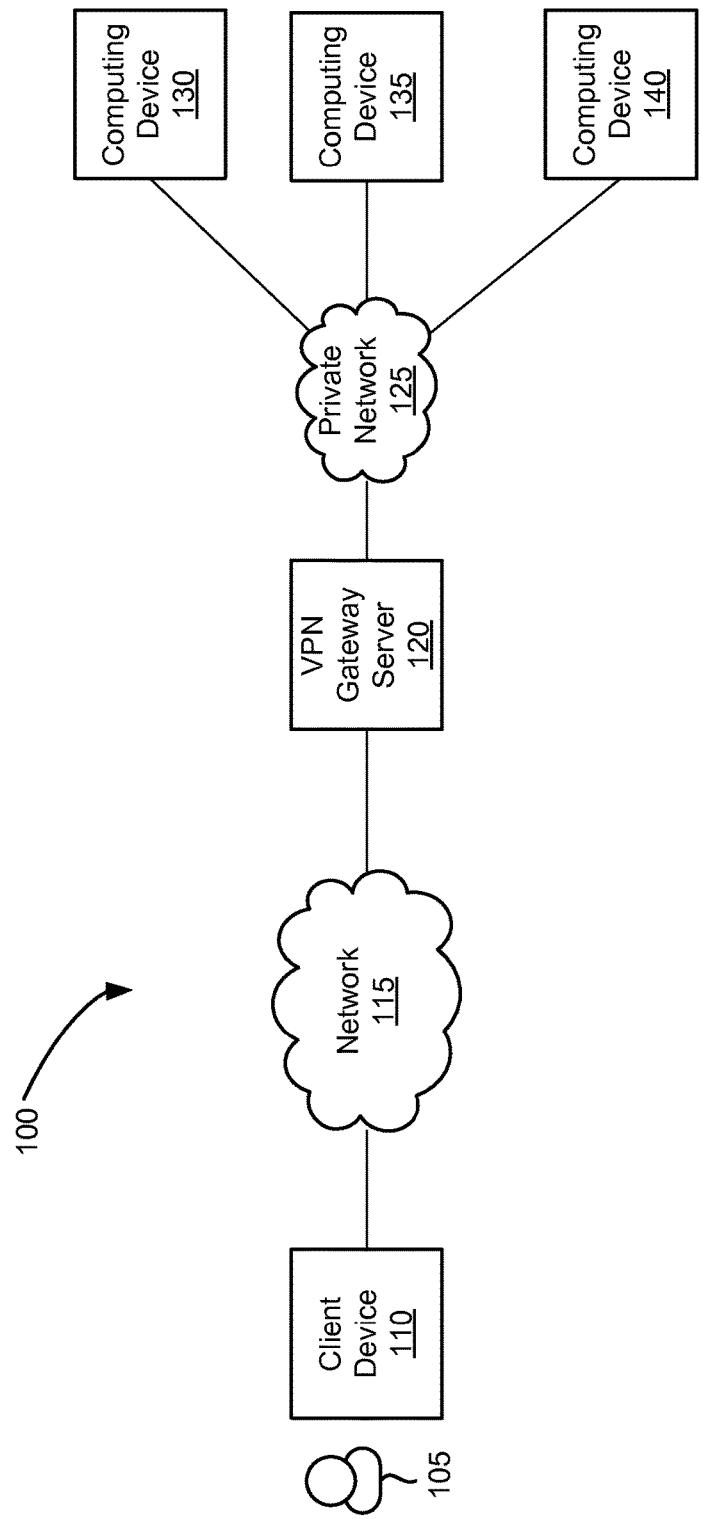
FIG. 1 is a block diagram of a VPN system.

FIG. 1 is a block diagram of a VPN system. The VPN system of FIG. 1 includes client device 110, network 115, VPN gateway server 120, private network 125, and computing devices 130, 135 and 140. Client device 110 may be operated by user 105 and may include a tablet, mobile device, desktop computer, or some other device. Client device 110 may initiate a VPN request with VPN gateway server 120. The VPN request may include user credentials and an equipment identifier. The user identifier may be stored on client device 110 or received via input from user 105. The equipment identifier is associated with a piece of equipment or hardware within client device 110. The request may be received by VPN gateway server 120 over network 115. Client device 110 is discussed in more detail below with respect to FIG. 2.

Network 115 may be a public network, private network, WAN, LAN, intranet, the Internet, a cellular voice network, a cellular data network, and any combination of these networks. Network 115 may send and facilitate communication between client device 110 and VPN gateway server 120.

VPN gateway server 120 may communicate with network 115 and private network 125. VPN gateway server 120 may be implemented as a network server and/or application server which communicates with the Internet. Server 120 may process requests for a secure VPN request. For example, VPN gateway server 120 may receive and process VPN connection requests from client device 110.

Private network 125 may be an intranet or other private network, for example a private network maintained by a business. Computing devices 130, 135 and 140 may be accessible to client device 100 through a secure VPN connection established via VPN gateway server 120.

Figure 2:
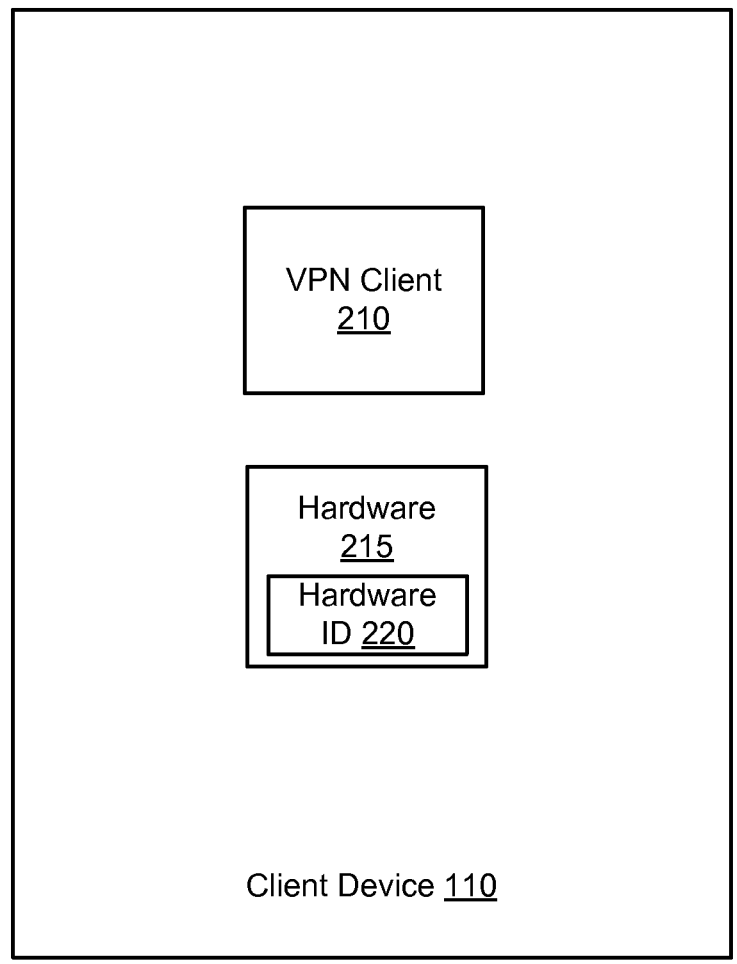
FIG. 2 is a block diagram of a client device.

FIG. 2 is a block diagram of a client device. The client device of FIG. 2 provides more detail for client device 110 of FIG. 1. Client device 110 includes VPN client 210 and hardware 215. VPN client 210 is an application stored on client device 110 which may manage VPN connections for client device 110. VPN client 210 may access equipment identifiers for equipment on client device 110. The equipment identifiers may include a serial number, part number, or other unmutable number or string of characters for equipment installed on client device 110. VPN client 210 may also communicate with outside networks, provide a user interface for working through a secure VPN connection, and otherwise manage a secure VPN connection at the client device.

Hardware 215 may include any hardware component installed on client device 110. Examples of hardware 215 include a hard disk drive, speaker, processor, memory, display, and other components. Each hardware component 215 may include a hardware identifier 220. The hardware identifier may include a serial number, manufacturing number, part number, or some other identifier for the hardware component.

Figure 3:
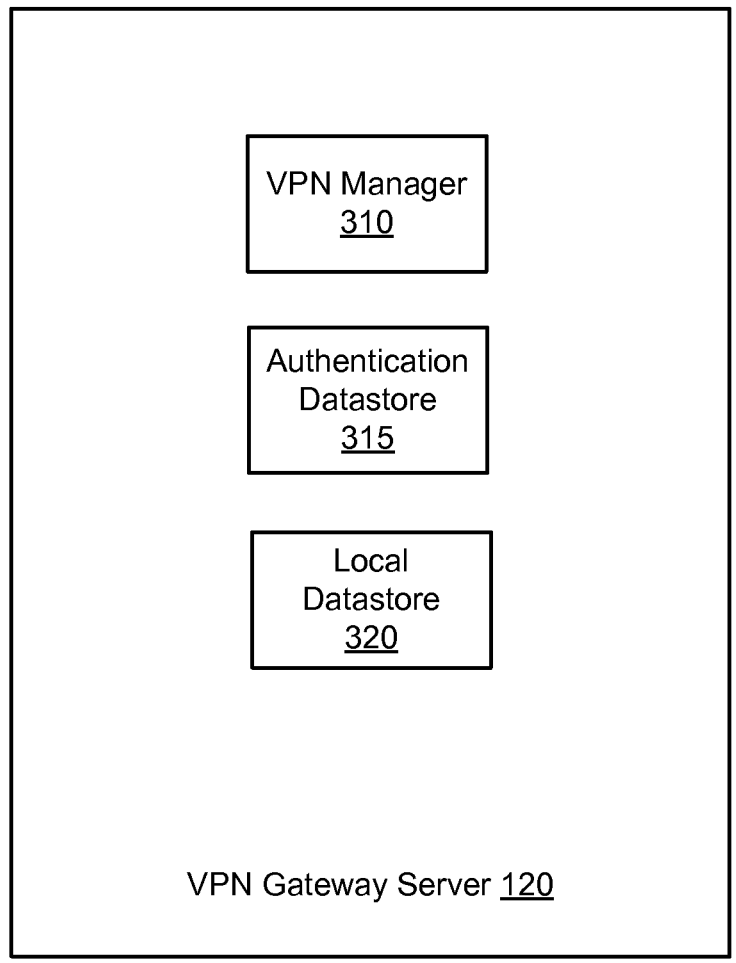
FIG. 3 is a block diagram of a VPN gateway server.

FIG. 3 is a block diagram of a VPN gateway server. VPN gateway server 120 includes VPN manager application 310 authentication data store 315, and local data store 320. VPN manager 310 may be an application that manages secure VPN connections at the VPN gateway server 120. The manager 310 may query equipment identifiers from authentication data store 315. The manager may further apply policies, business rules, and determine whether connection requests will be granted or not. VPN manager 310 may also maintain various settings for establishing a VPN connection, such as whether a request associated with an unregistered hardware identifier will be allowed.

Authentication data store 315 may be local to the VPN Gateway Server 120, or on a remote server on the private network 125. Data store 315 may store one or more tables of data. The data may include user identifiers, equipment identifiers, time stamps related to requests, operations and level of the access allowed for equipment identifiers and user identifiers, and other data. In some embodiments, a user identifier and equipment identifier may be correlated such that a VPN connection requires a matching pair of user identifier and equipment identifier. A VPN connection may be granted for any combination of a matching user identifier and a matching equipment identifier.

Local data store 320 may be stored locally at VPN gateway server 120.

Figure 4:
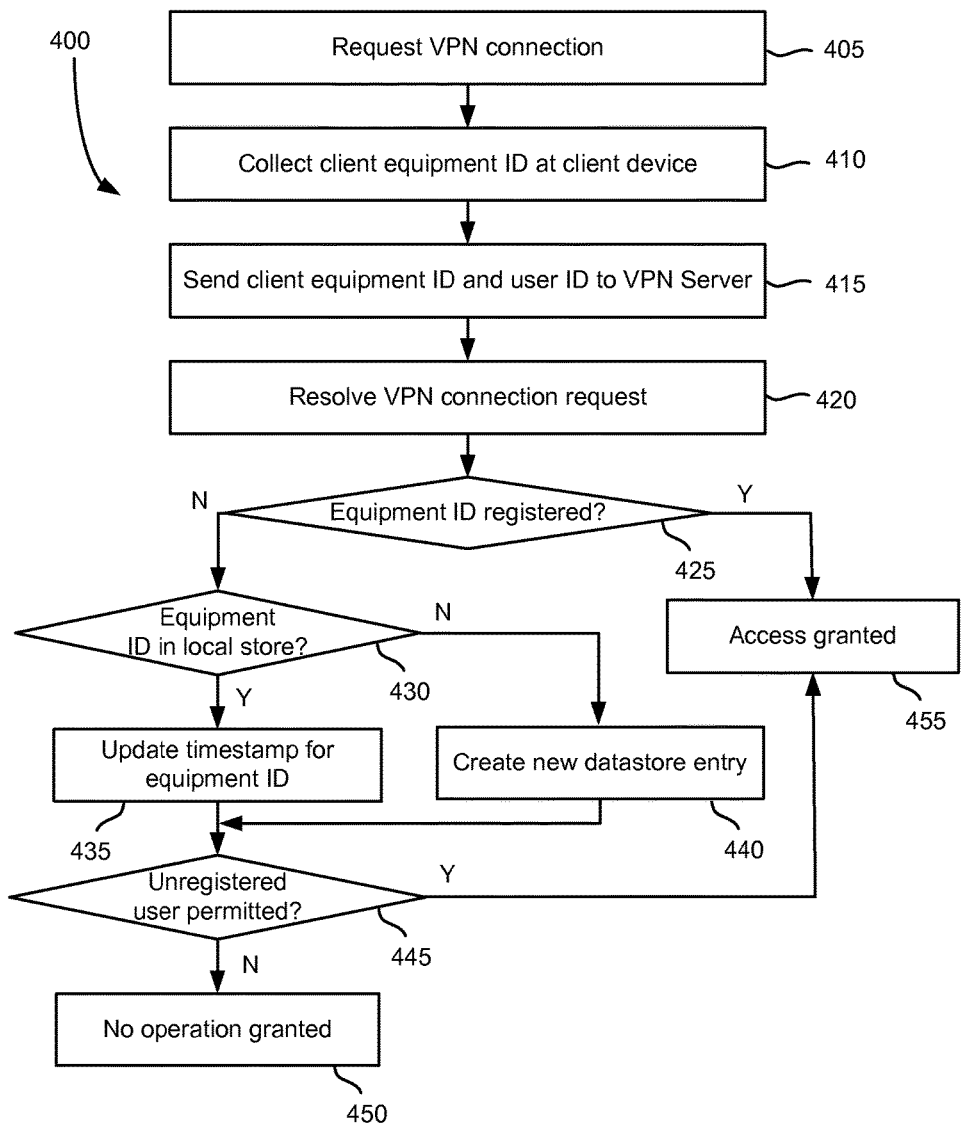
FIG. 4 is a method for providing a secure VPN connection.

FIG. 4 is a method for providing a secure VPN connection. A VPN connection is requested at step 410. The request may be made by a client application on client device 110. The request may include a user identifier and may be received by a VPN gateway server 120. Next, a client equipment identifier is collected at a client device at step 410. A client application on client device 110 may collect the equipment identifier to complete the request. The equipment identifier may be collected initially by the client application or in response to a request received from VPN gateway server 120. The client equipment identifier is transmitted to the VPN gateway server at step 415.

A VPN connection request is resolved by the VPN gateway server 120 at step 420. Resolving the connection request involves VPN gateway server 120 comparing the user identifier and the equipment identifier against stored identifiers in the authentication data store 315. Resolving a VPN connection request is discussed in more detail below with respect to the method of FIG. 5.

If the equipment ID is determined to be registered at step 425, access is granted at step 455. Operations may be applied for the matching equipment identifier at step 435. Applying operations may include allowing the requested operations to be performed, informing client application 210 of the operations which may be performed by client device 110, or granting and communicating a level of access allowed to in client 210.

If an equipment identifier is not registered at step 425, a check may be made to determine if an entry exists for this user and equipment ID in a local data store at step 435. If no such entry is found, then a new data entry is created and stored in the local data store 320 at step 440 and the method continues to step 445. The new data entry may include a user identifier, equipment identifier, and time stamp. If an entry is found for this user and equipment ID in the local data store, then the timestamp of that entry in the local data store is updated and the method continues to step 445.

A determination is made as to whether unregistered users are permitted to perform operations at step 445. In some embodiments, VPN gateway server 120 may maintain a setting regarding unregistered user permissions. For example, registered users may be allowed to access computing devices 130 and 135, while unregistered users may only be allowed to access computing device 130. If unregistered users are not permitted to perform actions or establish a VPN connection, then no operation is granted at step 450. If unregistered users are permitted to perform actions, the method of FIG. 4 continues to step 455 where access is granted to the unregistered user.

Figure 5:
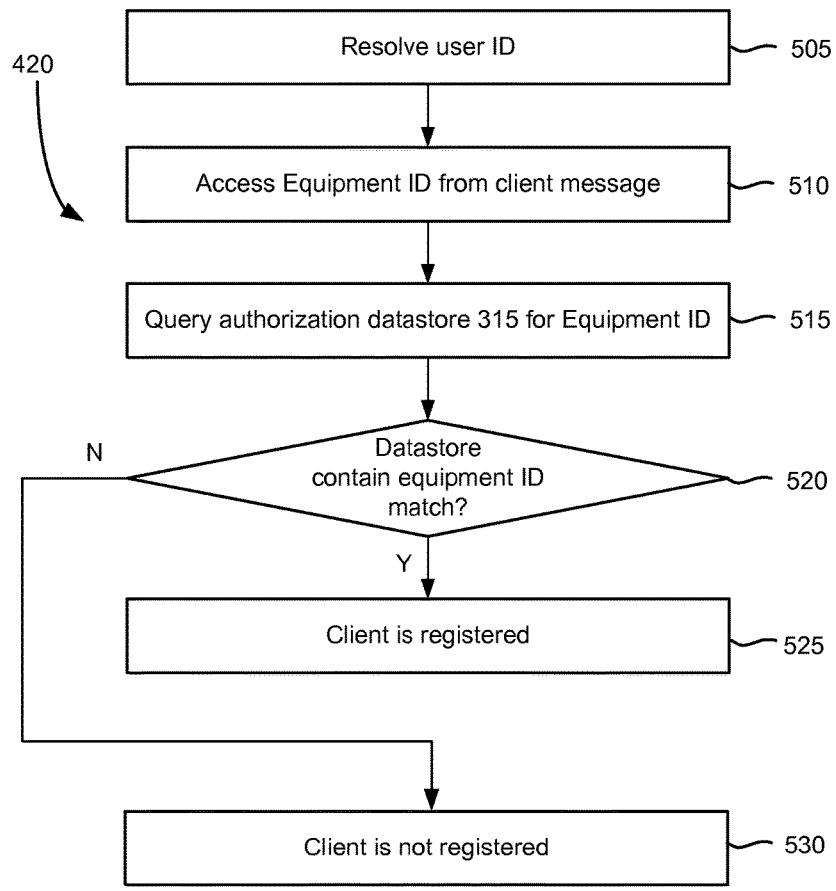
FIG. 5 is a method for resolving a VPN connection request.

FIG. 5 is a method for resolving a VPN connection request. The method of FIG. 5 provides more detail for step 420 of the method of FIG. 4. An equipment identifier is accessed from a client message received by VPN gateway server 120 at step 510. The client message is received from VPN client application 210 on client device 110. Authentication data store 315 is then queried by VPN manager 310 for a registered equipment identifier at step 515. A determination is then made as to whether the data store contains an equipment identifier match for the equipment identifier in the client message at step 520. If the data store contains a matching equipment identifier, then the user at the client device 110 is registered at step 525. If the data store does not contain an equipment identifier match, then the client is not registered at step 520.

Figure 6:
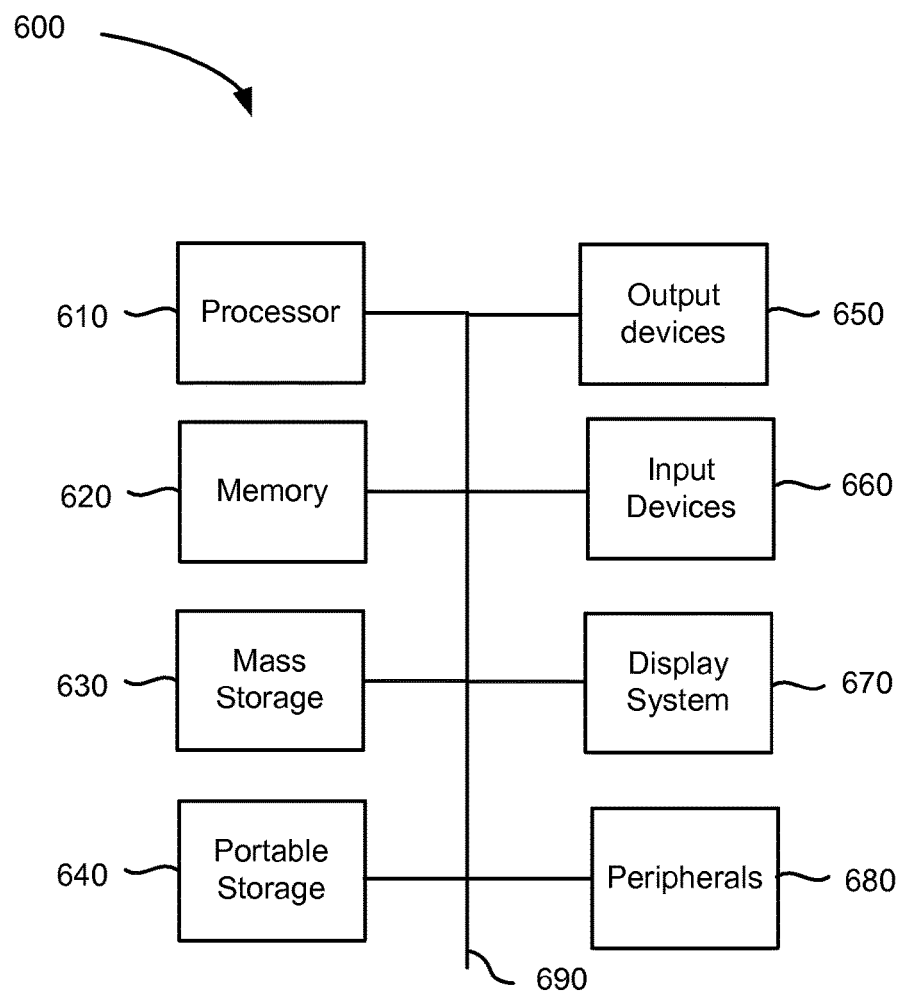
FIG. 6 illustrates a computing system that may be used to implement a computing device for use with embodiments of the presently disclosed invention.

FIG. 6 illustrates an computing system 600 that may be used to implement a computing device for use with embodiments of the presently disclosed invention. System 600 of FIG. 6, or elements thereof, may be implemented in the contexts of a data store, application server, network server, database, and client devices. The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650.

Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for establishing a connection, the method comprising:
   receiving a client access request from a client, wherein the client access request is for a virtual private network;
   executing instructions stored in memory to compare a client hardware identifier to a list of stored hardware identifiers stored in a first data store, wherein the client hardware identifier is not mutable;
   comparing the client hardware identifier to one or more stored hardware identifier entries at a local data store; and
   providing a connection having a level of access based on the client hardware identifier.

2. The method of claim 1, wherein the client hardware identifier is a hard drive identifier.

3. The method of claim 1, further including requesting the client hardware identifier in response to receiving the client access request.

4. The method of claim 1, wherein the comparison of the client hardware identifier to the list of stored hardware identifiers identifies that the client hardware identifier is not a match.

5. The method of claim 4, further including storing the client hardware identifier in a data store.

6. The method of claim 1, wherein the client is a mobile device.

7. The method of claim 1, further comprising identifying that a user identifier associated with a client user matches a registered user identifier.

8. The method of claim 1, wherein the request is sent by an application on a mobile device.

9. A non-transitory computer-readable storage medium having embodied thereon a program, the program being executable by a processor to establishing a connection, the method comprising:
   receiving a client access request from a client, wherein the client access request is for a virtual private network;
   comparing a client hardware identifier to a list of stored hardware identifiers stored in a first data store, wherein the client hardware identifier is not mutable;
   comparing the client hardware identifier to one or more stored hardware identifier entries at a local data store; and
   providing a connection having level of access based on the hardware identifier.

10. The non-transitory computer-readable storage medium of claim 9, wherein the client hardware identifier is a hard drive identifier.

11. The non-transitory computer-readable storage medium of claim 9, wherein the program is further executable to request the client hardware identifier in response to receiving the client access request.

12. The non-transitory computer-readable storage medium of claim 9, wherein the comparison of the client hardware identifier to the list of stored hardware identifiers identifies that the client hardware identifier is not a match.

13. The non-transitory computer-readable storage medium of claim 12, wherein the program is further executable to store the client hardware identifier in a data store.

14. The non-transitory computer-readable storage medium of claim 9, wherein the program is further executable to determine that a user identifier associated with a client user matches a registered user identifier.

15. A method for establishing a connection, the method comprising:
   receiving a user interface from a client;
   receiving a client access request from the client over the user interface, wherein the client access request is for a virtual private network;
   executing instructions stored in memory to compare a client hardware identifier to a list of stored hardware identifiers stored in a first data store, wherein the client hardware identifier is not mutable;
   comparing the client hardware identifier to one or more stored hardware identifier entries at a local data store; and
   providing a connection having a level of access based on the client hardware identifier.

* * * * *